C. H. MOORE.
Water-Closet.
No. 207,196. Patented Aug. 20, 1878.
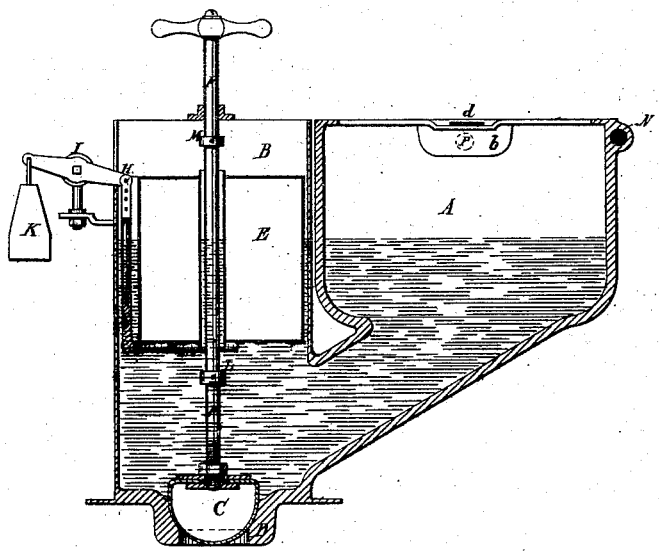
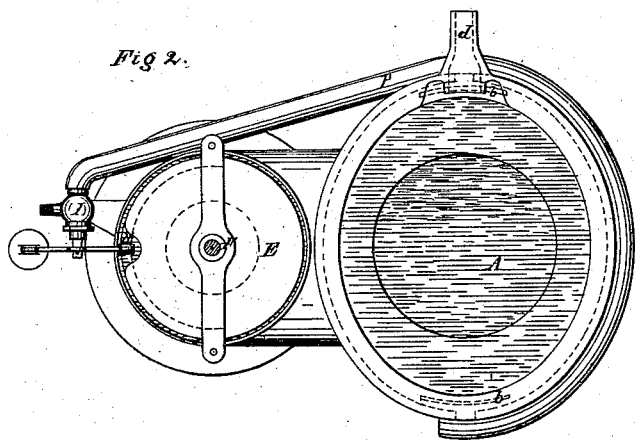
WITNESSES.
R. Schmidt.
Wm Schwanhausser
INVENTOR.
Chas. H. Moore

UNITED STATES PATENT OFFICE.

CHARLES H. MOORE, OF YONKERS, NEW YORK.

IMPROVEMENT IN WATER-CLOSETS.

Specification forming part of Letters Patent No. 207,196, dated August 20, 1878; application filed April 4, 1878.

*To all whom it may concern:*

Be it known that I, CHAS. H. MOORE, of Yonkers, in the county of Westchester and State of New York, have invented new and useful Improvements in Water-Closets; and do hereby declare that the following is a full, clear, and exact description thereof, reference being had to the accompanying drawing, making part of this specification, in which—

Figure 1 represents a central vertical section of my water-closet. Fig. 2 is a horizontal view of the top of water-closet, showing the course of water supplying bowl and the ventilating-pipe.

The object of my invention is to produce a water-closet without an overflow, yet with a method of opening the outlet-valve to take away any surplus of water that may accumulate from leakage of valve, a closet that will be free from odor at all times if practically put in, simple and certain in its operation, and durable and easily repaired.

A represents the bowl of the closet, which can be cast on chamber B, or, if porcelain, can be secured by a flange with bolts and nuts. B represents the chamber, into which the float E operates upon the spindle F to open supply-valve I and outlet-valve C when necessary. C is a hollow rubber valve, to prevent any egress of water from closet when not in use, and, by being raised from socket D, permits the bowl to empty. F is a spindle, operating through a recess in float E and connected to outlet-valve C. L is a check put on spindle F, for the purpose of lifting the float when the outlet-valve is raised, and prevents its resting on lever H and opening supply-valve I. M is a check on spindle F, against which float E would rest in case of any surplus of water coming in the bowl. E is a float, with a hole through the center, which slides and operates upon the spindle F, having play enough to weigh upon the lever H and open supply-valve I sufficient to admit a good wash to bowl A, rising gradually as the water increases in bowl until the water is at a desired height, when it will float and free itself from lever H and permit the weight K to close supply-valve. It is also intended to float in case of a surplus of water coming into the closet, and, stopping against the check M on spindle, would lift the outlet-valve from its socket and permit the surplus water to escape into soil-pipe. H is an adjustable lever attached to the supply-valve I, upon which the float E rests, and opens supply-valve I when necessary. I is a compression-valve, opened by float E resting and weighing upon lever H, and closed by the weight K when the closet becomes full enough of water to buoy the weight of float free from lever H. P is inlet to bowl. N is a course for water from inlet P to spreads *b b*. *d* is a ventilating attachment; D, the socket and outlet.

The especial advantages possessed in this device are:

First. By dispensing entirely with an overflow you avoid the possibility of any sewer-gas making its way through the closet.

Second. By this method, should the water escape into the closet very rapidly, the float E would raise tube C until the four-inch opening at socket D opened enough to make it impossible for the closet to overflow.

Third. The supply-valve I can either be compression or plug cock, and can be so practically arranged that it will work to perfection, with little liability of getting out of order.

Fourth. The hollow rubber outlet-valve C will conform itself to socket D, and will not be liable to let the water escape should a little particle obstruct the way.

Fifth. The plan of raising the float from the lever H prevents the water from running so long as the outlet-valve C is raised. This economizes some in the use of water, which is of some importance. By removing check L the supply will open immediately upon raising valve C.

Sixth. By having the spreads *b b* the bowl of closet is washed front and back, which is important.

Seventh. The ventilating attachment, being in a position where the water does not come in contact with it, and at the extreme top of bowl, works to perfection if properly connected with chimney-flue, or carried through roof, with a proper appliance on top, preventing any odor rising into the room when the closet is in use.

Eighth. The device is simple, can be easily understood, easy to repair or replace any part of it, and not liable to get out of order.

Having thus described my invention, what I claim as new, and desire to secure by Letters Patent, is—

1. In combination with the closet-bowl A, inlet P, water-spread b, and chamber B, the float E, fitted loosely upon the spindle F, provided with check M, as and for the purpose set forth.

2. A water-closet having a float, E, with passage through the center, operating in the chamber B upon spindle F, having checks L and M, substantially as shown, and for the purpose specified.

3. In combination with the closet-bowl A, inlet P, water-spread b, chamber B, float E, and spindle F, the valve C, the supply-valve I, secured to the chamber B, and having lever H and weight K, as and for the purpose set forth.

4. A water-closet bowl, A, with water-spreads b b, having water-course N and a ventilating attachment, d, at the extreme upper portion, as shown and described.

This specification of my invention signed by me this 28th day of March, 1878.

CHARLES H. MOORE.

Witnesses:
JAMES B. ARCHIBALD
E. B. MUDGE.